T. D. WARNER.
WARNING SIGNAL MEANS FOR GARAGES.
APPLICATION FILED MAR. 17, 1915.
1,172,083.
Patented Feb. 15, 1916.
3 SHEETS—SHEET 1.
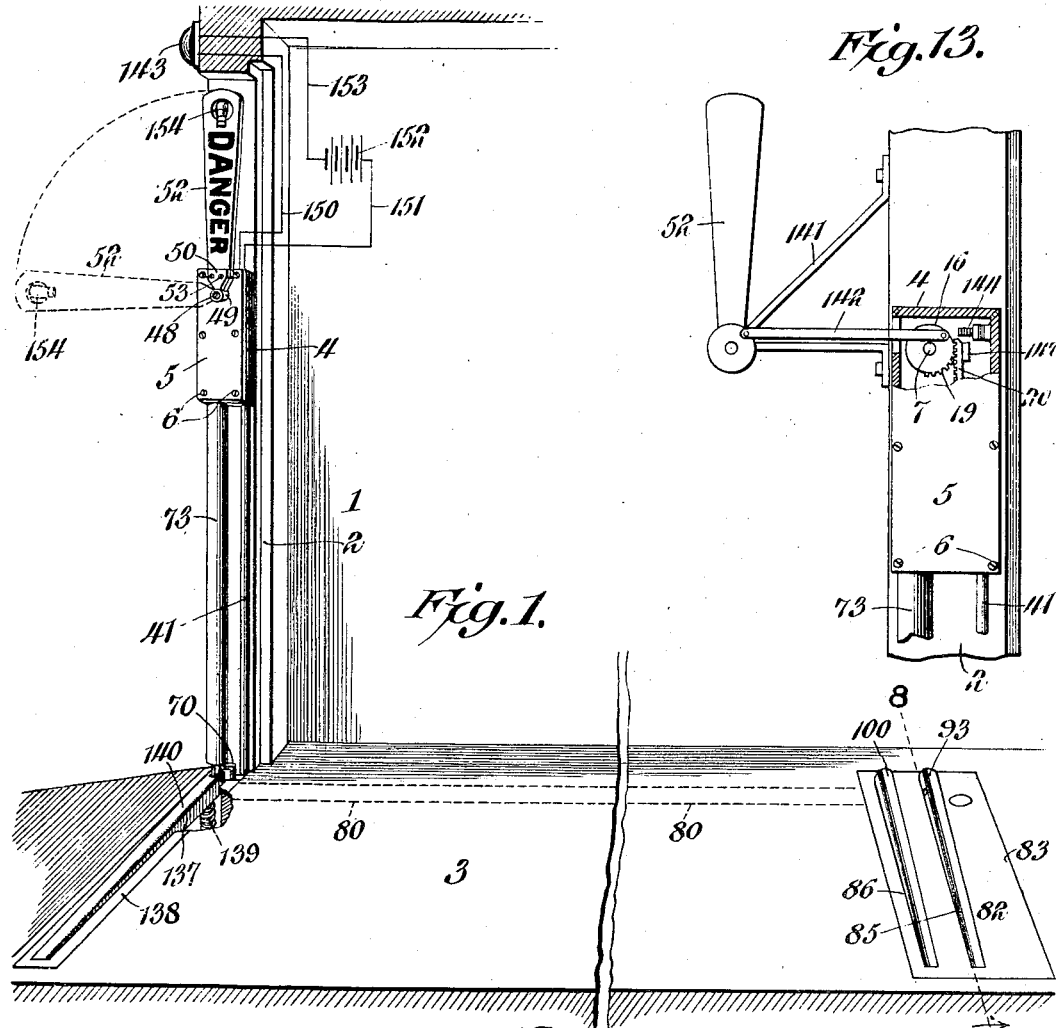
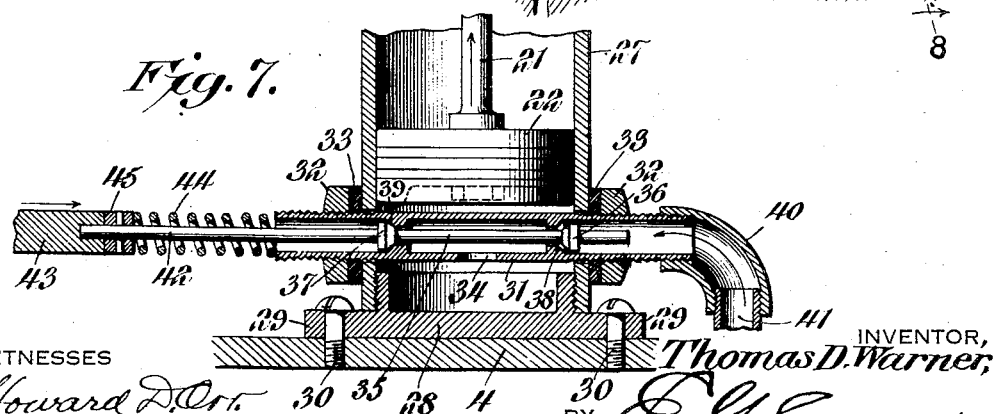
WITNESSES
INVENTOR,
Thomas D. Warner,
BY
ATTORNEY T. D. WARNER.
WARNING SIGNAL MEANS FOR GARAGES.
APPLICATION FILED MAR. 17, 1915.
1,172,083.
Patented Feb. 15, 1916.
3 SHEETS—SHEET 2.
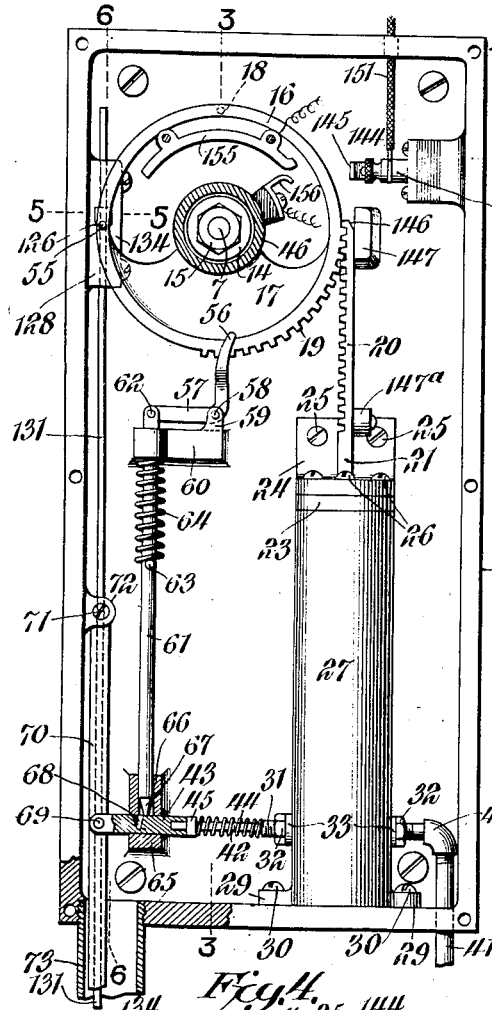
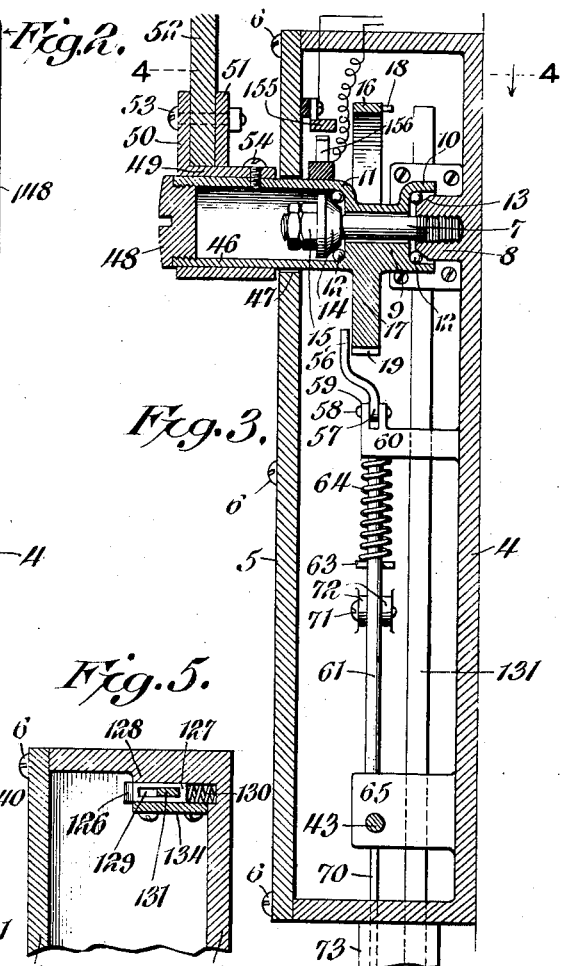
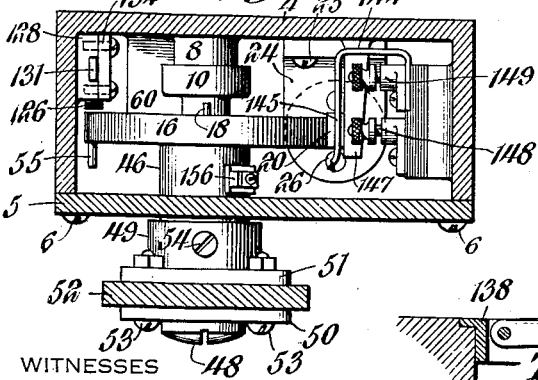
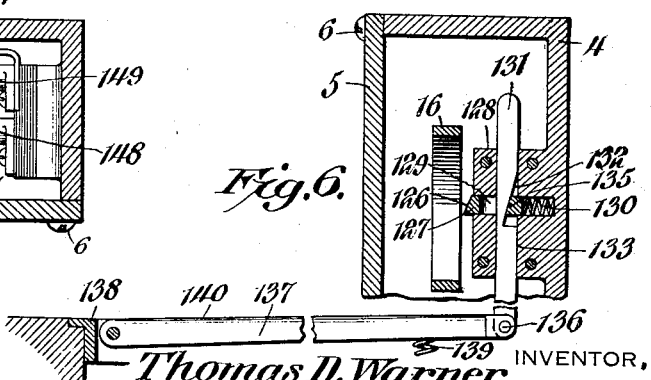
WITNESSES
Howard D. Orr.
F. T. Chapman
Thomas D. Warner, INVENTOR,
BY E. G. Siggers
ATTORNEY

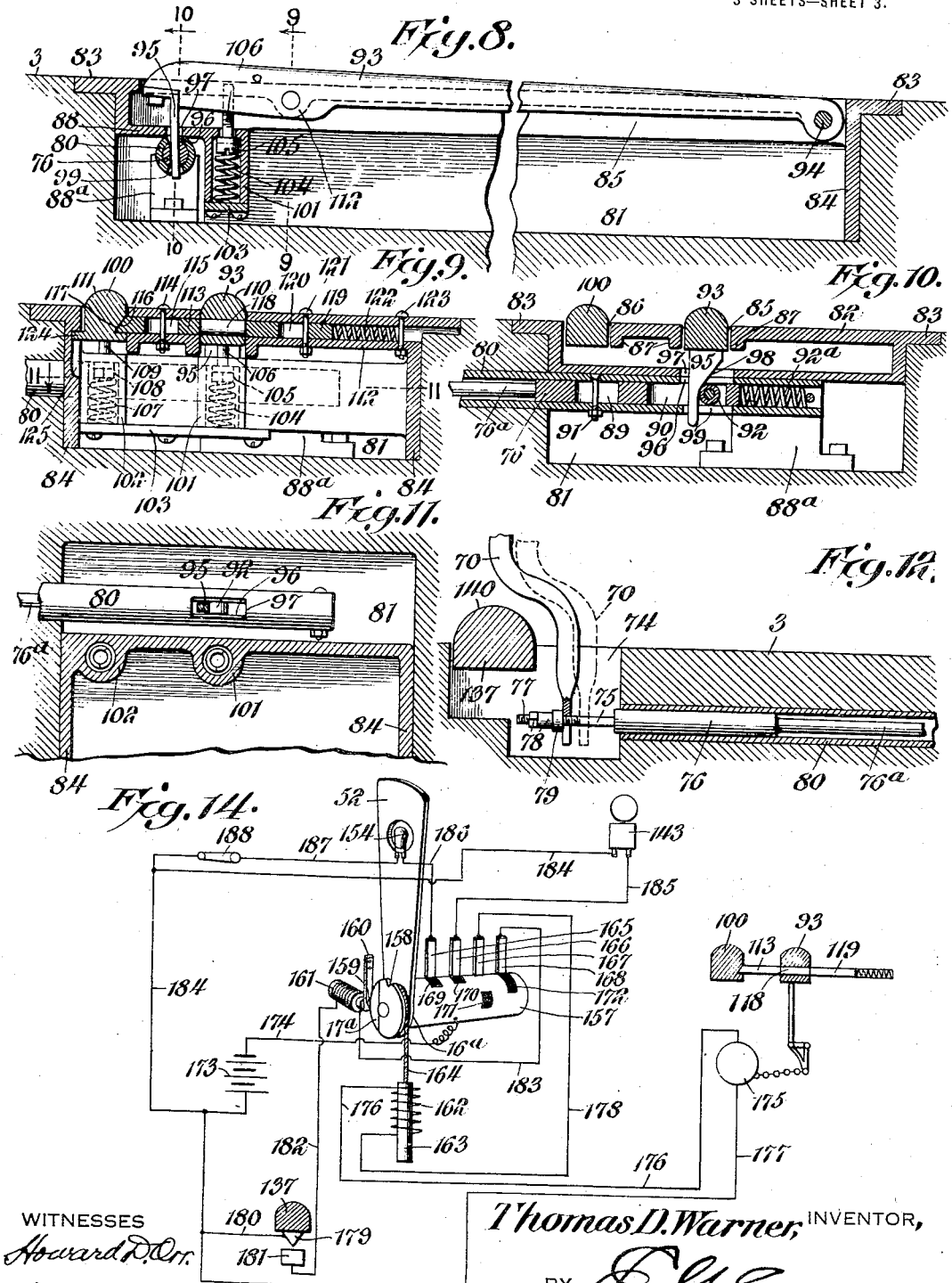

UNITED STATES PATENT OFFICE.

THOMAS D. WARNER, OF JONESBORO, ARKANSAS.

WARNING-SIGNAL MEANS FOR GARAGES.

1,172,083.  Specification of Letters Patent.  Patented Feb. 15, 1916.

Application filed March 17, 1915. Serial No. 15,109.

*To all whom it may concern:*

Be it known that I, THOMAS D. WARNER, a citizen of the United States, residing at Jonesboro, in the county of Craighead and State of Arkansas, have invented a new and useful Warning-Signal Means for Garages, of which the following is a specification.

This invention has reference to warning signal means for garages, and its object is to provide a signal means automatically actuated and set at the danger or warning position in the event of an automobile approaching the door or outlet of the garage to emerge therefrom, the signal being set at the warning position whether or not the automobile continues its movement to and through the door, or for some reason stops on its way out.

The invention comprises warning means located with respect to the place of egress of the automobile from the garage to apprise passing pedestrians and others of the impending emergence of the automobile. Within the garage and preferably in the floor thereof, so as to be operated by the passing wheels of the automobile, controlling means for the signals are provided, so that warning is given a sufficient time before the automobile reaches the egress or doorway to permit passers by to avoid danger, and as the automobile emerges from the garage the signals are returned to the safety condition, which in the case of a visual signal means a position of the signal either out of sight or commonly recognized as a safety position, while the audible signal is stilled.

By the present invention provision is made for avoiding the operation of the signals on the entrance of the automobile into the garage.

The invention will be best understood from a consideration of the following detailed description, taken in connection with the accompanying drawings forming a part of this invention, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a perspective view of a signal equipment as applied to the door end of a garage, a portion only of the latter being shown. Fig. 2 is an elevation with some parts removed and other parts in section of a pneumatically actuated mechanism for moving the danger signal to the danger position and permitting its return to the safety position. Fig. 3 is a section on the line 3—3 of Fig. 2. Fig. 4 is a section on the line 4—4 of Fig. 3. Fig. 5 is a section on the line 5—5 of Fig. 2 with parts omitted. Fig. 6 is a section on the line 6—6 of Fig. 2 with certain intermediate parts broken away and omitted. Fig. 7 is a vertical diametric section of the lower end of the pneumatic actuating device for the semaphore arm. Fig. 8 is a section on the line 8—8 of Fig. 1 but drawn on a larger scale. Fig. 9 is a section on the line 9—9 of Fig. 8. Fig. 10 is a section on the line 10—10 of Fig. 8. Fig. 11 is a section on the line 11—11 of Fig. 9. Fig. 12 is a section of a sunken portion of the trip mechanism. Fig. 13 is a view, partly in elevation and partly in section, showing a modified form of semaphore support. Fig. 14 is a diagram illustrating electrical controlling and actuating means for the danger signal in place of pneumatic means illustrated in the other figures of drawing.

Referring to the drawings there is shown in Fig. 1 a small portion of a garage 1 having a door opening 2 and a floor 3, which latter may be considered as a concrete floor, although, of course, the structure of the garage does not in itself enter into the present invention. Attached to one of the upright sides of the door frame is a box or casing 4, having a lid or cover 5 secured thereto by screws 6 or otherwise, to provide for convenient access to the interior of the box. Housed within the box 4 are certain devices and mechanisms forming part of the present invention, but it will be understood that such devices and mechanisms are not necessarily housed within a box or casing, but may be otherwise supported and protected so long as they are capable of performing their proper functions.

When the warning signal means of the present invention is installed in an already-built garage it may in many cases be advisable to support and house certain of the structures in a box or casing, thus avoiding more or less difficult changes which under some circumstances may be necessary.

For convenience of description it will be assumed that the casing 4 is used, in which case such box or casing is elongated, so as to be readily adapted to one of the upright side boards of the door casing with said box in an upright position. Within the box there is mounted a stud 7 screwed into a boss 8 formed in the back of the box, the latter being usually of cast or pressed metal, and this stud extends horizontally toward the front of the box. The stud 7 constitutes a spindle or support for a hub 9 capable of freely turning on the spindle and to facilitate the ease of turning of the hub it is formed at opposite ends with cups 10, 11, respectively housing anti-friction balls 12 confined by the cup 10 to a ball-race 13 formed on the outer end of the boss 8 and confined by the cup 11 against a cone 14 held on the outer end of the stud or spindle 7 by a nut 15.

Carried by the hub 9 and in the particular showing of the drawings shown as formed on the hub 9, is a circular rim 16 connected to the hub by a web 17 located on one side of a diameter of the rim, so as to serve as a counterweight, the weight 17 being of sufficient thickness for the purpose. At a point on the rim 16 remote from the counterweight 17 is a pin 18 projecting laterally from the rim. As this pin is in the nature of a stop or tooth it may be formed in one piece with the rim as a lug, or it may be separately formed and attached to the rim. Extending about the peripheral portion of the rim 16 for a distance of ninety degrees or more, is a series of gear teeth 19 so related to the counterweight 17 as to include a little more than one-half the circumferential extent of the counterweight from one end thereof to a mid point of the counterweight. In engagement with the gear teeth 19 is a rack bar 20 on or attached to and forming a continuation of a piston rod 21 carrying at the end remote from the rack bar a piston 22. The piston rod 21 passes through a head 23 carried by an angle plate 24 secured by screws 25 or otherwise to the back of the box 4. The head 23 is in turn secured by screws 26 or otherwise to one end of a cylinder 27, which latter at the other end is closed by a head 28 having ears 29 thereon for the passage of screws 30 fastening the head 28, and through it the corresponding end of the cylinder 27 to the inner wall of the bottom of the box 4.

Extending transversely and diametrically through the cylinder 27 close to the bottom thereof is a tubular valve casing 31 having exteriorly threaded ends projecting beyond corresponding sides of the cylinder 7 and there receiving nuts 32 with interposed washers 33, whereby the valve tube 31 is firmly locked and sealed in the cylinder. At any convenient point within the cylinder, and preferably at about midway of the diameter of the cylinder the tube 31 has a freely open port 34 whereby the interior of the valve tube 31 is in constant communication with the interior of the cylinder at a point below the piston 22, which latter is suitably packed for travel lengthwise of the cylinder without leakage by it, since the valve tube is designed to direct air under pressure into the cylinder 27 below the piston 22 to cause the elevation of the piston for a purpose which will hereinafter appear.

Within the tube 31 and capable of movement longitudinally of said tube is an elongated valve stem 35 having spaced valves 36, 37 thereon in proper relation to valve seats 38, 39 within the tube 31, and arranged on opposite sides of the port 34. Attached to one end of the tube 31 as by an elbow 40 is a pipe 41 which may be considered as suitably connected to a source of air under pressure.

It is customary in all well equipped garages to maintain a supply of air under pressure for filling automobile tires, and the pipe 41 may be connected to such an air supply for directing air under pressure as needed to the cylinder 27.

As will hereinafter appear when the purpose and operation of the device of the present invention are made apparent, the amount of air demanded is entirely negligible and shows no sensible demand upon the supply.

The valve stem 35 has a continuation 42 beyond the valve 37 and beyond the corresponding projecting end of the tube 31 and the end of this continuation 42 remote from the valve 37 is seated in a slide 43 in alinement with the continuation 42. Between that end of the tube 31 from which the continuation 42 projects and the adjacent end of the slide 43, the continuation 42 is surrounded by a spring 44 tending at all times to move the valve stem 35 in a direction to seat the valve 36 and open the valve 37. This spring 44 bears at one end against the corresponding end of the tube 31, and at the other end against a set collar 45 on the extension 42 of the valve stem adjacent to the slide 43, so as to normally bear against said slide 43.

Certain devices are provided for the operation of the slide 43 in a manner to cause the opening of the valve 36 with the simultaneous closing of the valve 37 and the reverse action of the valves, and such mechanism will be hereinafter described.

The hub 9 is designed to carry and actuate certain danger indicating means, and for this purpose the walls of the cup 11 are prolonged axially in the form of a sleeve 46 long enough to project through a suitable opening 47 in the cover 5 of the box 4, and for a suitable distance beyond said cover. This sleeve may be closed at the outer exposed end by a screw plug 48, or in any other suitable manner.

Mounted on and fast to the sleeve 46 is a collar 49 having at one end a radial flange 50 and mounted on the collar 49 is a ring 51 between which and the flange 50 there is confined one end of a semaphore arm 52. The ring 51 is made fast to the flange 50 by bolts 53 which are also passed through the semaphore arm 52. The collar 49 may be secured to the sleeve 46 in any suitable way, and a screw 54 connecting the collar to the sleeve is shown as an example of one way in which this may be accomplished. With the structure just described the semaphore arm is supported at one end, as is customary, in radial relation to rotative movements of the sleeve 46 and hub 9.

Projecting laterally from the rim 16 in about ninety degree relation to the pin or lug 18, but from the opposite side of the rim, is another pin or lug 55 in the path of which is the end of one arm 56 of an angle lever 57 mounted by means of a pivot pin 58 between ears 59 on a boss or projection 60 which may be formed on and project from the back of the box 4 toward the front thereof. The boss 60 is at an appropriate point traversed by a rod 61, which latter is suitably guided by the boss 60 and is connected to that end of the lever 57 remote from the arm 56 by a pivot pin 62. Surrounding the rod 61 between the boss 60 and a stop pin 63 traversing the rod is a spring 64 tending by its action upon the pin 63 to move the rod downwardly, said rod being an upright rod in the installed position, and this spring also tends to maintain the arm 56 in the path of the pin 55, but will yield to the action of the pin 55 upon the arm 56 tending to rock the lever 57.

The slide 43 is mounted in a boss or projection 65 which may be attached to or formed on the rear wall of the box 4, and entering this projection 65 through a suitable passage 66 therein is what constitutes the lower end of the rod 61, such end being pointed, as shown at 67, to enter a correspondingly shaped notch or recess 68 in the slide 43. Under the normal action of the spring 44 the slide 43 is maintained in the position where the notch 68 is out of alinement with the pointed end 67 of the rod 61 and under these conditions the valve 36 is closed and the valve 37 is open. When, however, the slide 43 is moved against the normal tendency of the spring 44, the notch 68 is brought into coincidence with the pointed end 67 of the rod 61, and the expansion of the spring 64 thereupon moves the rod 61 so that the pointed end 67 seats in the notch 68 and the end 56 of the lever 57 is brought correspondingly closer to the pin 55 for a purpose which will hereinafter appear.

The slide 43 at the end remote from the valve rod extension 42 is connected by a pivot pin 69 to an upright lever 70 pivoted at the upper end by a pivot pin or screw 71 to ears 72 formed on and projecting from one side of the box 4. The lever 70 extends through the bottom of the box 4 through a protecting pipe or casing 73 extending along the upright side of the door casing to which the box 4 is attached to a point near the floor 3 of the garage. The pipe or casing 73 performs the sole function of a protecting means for the lever 70, and where the installation permits and other protecting means are provided the pipe 73 may be omitted. The lower end of the lever 70 is carried into a recess or socket 74 formed on the floor 3, and there is shaped to straddle an attenuated end extension 75 of a rod 76. The extension 75 is threaded at its outer extremity as shown at 77 to receive lock nuts 78 and an abutment washer 79. The rod 76 is supported for longitudinal movement in a tube 80, which may be suitably embedded in the floor 3 and extends into the garage for an appropriate distance, preferably to a greater extent than the average length of an automobile, but any exact length of the rod 76 is not demanded.

That end of the rod 76 which enters the recess 74 is shown in Fig. 12, while the other end of this rod and of the tube 80 is shown in Figs. 8, 9, 10 and 11, the tube 80 being indicated in dotted lines in Fig. 1. For the greater portion of the distance between the ends of the rod 76, it is of reduced diameter as shown at 76ª to avoid frictional contact with the tube 80. That end of the tube 80 remote from the doorway 2 is extended into a pit 81 in the floor 3, and covering this pit is a plate 82 having its upper surface flush with the floor 3 and having marginal ledges 83 sunk into the floor to provide a smooth supporting finish. The plate 82 has depending walls 84 serving as stiffening and strengthening means for the plate 82, and the latter has elongated slots 85, 86 formed therethrough with depending marginal lips 87 on opposite sides. Below the plate 82 and connected to the side walls 84 is a shelf 88 spaced from the under face of the plate 82. This shelf is in underriding relation to one end of the slots 85 and 86, and under this shelf in traversing relation to the slots 85 and 86, but separated therefrom by the shelf, is the corresponding end of the tube 80, which at its extreme end is supported by a block 88ª resting upon and secured to the bottom of the pit 81. Within that end of the tube 80 entering the pit 81 the rod 76 is of full diameter, and is formed with two adjacent longitudinal diametric slots 89, 90, respectively. The slot 89 is traversed by a pin or bolt 91 serving to limit the travel of the rod 76, while within the slot 90 there is mounted a roller 92 having a purpose to be described. Between that end of the rod 76 entering the pit 81 and the corresponding end of the tube 80 there is mounted a spring 92ª tending at all times to move the rod 76 toward the recess 74 and thereby tending to rock the lever 70 in a direction which will cause the slide 43 to move in a manner to bring the notch 68 out of the path of the pointed end 67 of the rod 61 located within the box 4. The slots 85 and 86 are each approximately as long as the plate 82, which in turn is made somewhat longer than the width of the wheel base of an automobile.

Mounted in the slot 85 is a bar 93 secured at one end to depending portions of the plate 82 by a pivot pin 94. The other end of the bar 93, which bar may increase in thickness from one end toward the other, is located over the shelf 88 and carries a depending finger 95 entering the tube 80 through a slot 96 in the upper portion of the tube and a corresponding slot 97 in the shelf 88, the slots 96 and 97 matching and opening into the slot 90 in the bar 76. The finger 95 narrows toward the lower end, thereby providing a bevel shoulder 98, while the narrower end of the finger is long enough to project through another slot 99 in the tube 80 diametrically opposite to the slot 96. The finger 95 is so positioned that the bevel shoulder 98 engages the roller 92 and when the bar 93 is moved about the pivot 94, said bar extending transversely of the length of the rod 76, the shoulder 98 engaging the roller 92 forces the bar 76 lengthwise against the action of the spring 92ª. This movement by the engagement of the washer 79 with the corresponding end of the lever 70 causes a rocking movement of the latter, which is transmitted to the slide 43, and by said slide to the valve stem extension 42 by way of the set collar 45, thus moving the valve 37 to the closed position and the valve 36 to the open position, this movement being against the normal tendency of the spring 44, which latter, however, need not be powerful enough to move the lever 70 in a manner to actuate the rod 76, since movements of the rod 76 when not under the control of the shoulder 98 are brought about by the expansion of the spring 92ª.

Seated in the slot 86 in parallel spaced relation with respect to the bar 93, is another similar bar 100 which may be considered as similarly pivoted at one end and similarly overriding the shelf 88 at the other end. Depending from the shelf 88 are casings 101 and 102 having their lower ends closed by a removable plate 103. The casing 101 contains a spring 104 bearing against a head 105 on a stem 106 carried by the bar 93 near the end thereof remote from the pivot 94. Within the casing 102 is a spring 107 bearing against a head 108 carried by a stem 109 secured to the bar 100 similar to the stem 106 with respect to the bar 93.

Each bar 93 and 100 is elevated by the respective springs 104 and 107, so that those ends underridden by the springs are lifted above the top surface of the plate 82 for an appropriate distance, and such portions of the bars are rounded, as indicated at 110 and 111, respectively. This rounding of the bars prevents injury to automobile tires, which, as will hereinafter appear, engage these bars and depress them against the action of the respective springs 104 and 107 when the automobile leaves or enters the garage.

Immediately below the plate 82 at a point adjacent to the casings 101 and 102 is a tubular housing 112 extending transversely of the length of the bars 93 and 100. In this casing between the bars 93 and 100 is a slidable bolt 113 limited in its sliding movements by a pin 114 carried by the plate 82 and housing 112, and extending through a longitudinal slot 115 in the bolt 113. That end of the bolt adjacent to the bar 100 is beveled, as shown at 116, and the portion of the bar 100 where meeting the bolt 113, is formed with a beveled pocket 17. Traversing the bar 93 is another bolt 118 of a length the same as the width of the bar and alined with the bolt 113 when the bar 93 is in its elevated position. Lodged within the housing 112 on the side of the bar 93 remote from the bar 100 is another sliding bolt 119 having a longitudinal slot 120 traversed by a stop pin 121, while a spring 122 within the housing 112 having one end engaging the bolt 119 and the other bearing against a stop pin 123, normally maintains the bolt 119 flush or substantially flush with the side of the slot 85 toward the bolt 119.

Under normal conditions the spring 122 holds the bolt 119 with its end in engagement with the bolt 118, so that the division line between these two bolts is at the corresponding edge of the slot 85 in which the bar 93 is seated. Since the bolt 118 is of the same length as the width of the bar 93, the bolt 113 is then held by the bolt 118, so that the meeting edges are in line with the opposite wall of the slot 85 and the beveled end 116 of the bolt 113 is seated in the bevel pocket 117. On that side of the bar 100 remote from the bolt 113 there is a lug 124 extending into a recess 125 in one of the depending walls 84 of the plate 82. This lug not only prevents too great a rise of the bar 100 under the action of the spring 107, but also serves to resist side thrust of the bolt 113 on the bar 100, and the lug 124 being of small area provides for restricted frictional contact of the bar when moving and subjected to the side thrust of the bolt 113.

With the parts in position as shown in Fig. 9, a pressure applied to the bar 100 tending to depress it against the lifting tendency of the spring 107 causes a longitudinal movement of the bolt 113 because of the action of the bevel pocket or shoulder 117 against the bevel end 116 of the bolt 113. This movement of the bolt 113 is transmitted through the bolt 118 to the bolt 119 causing a compression of the spring 122 and a movement of the bolt 118 into that portion of the casing 112 to the corresponding side of the slot 85, while the bolt 118 enters to a commensurate distance into the bar 93. The result of this is that the bar 93 is supported by two bolts then resting upon the bottom of the housing 112, wherefore no force short of a destructive force can then depress the bar 93. If, however, with the parts in the position shown in Fig. 9 a depressing force sufficient to overcome the spring 104 be applied to the bar 93, the bolt 118 is carried with it out of the path of either of the bolts 113 or 119. With the bar 93 thus depressed, no amount of pressure short of a destructive pressure will, when applied to the bar 100, depress such bar, since the bolt 113 cannot then move longitudinally, and so the beveled end 116 cannot move out of the pocket 117. Under these circumstances the bar 100 remains in the elevated position despite the presence of a depressing pressure ordinarily sufficient to force it downward.

When air is admitted to the cylinder 27 the piston is raised and the rack 20 in engagement with the gear teeth 19 causes a rotative movement of the rim 16 imparting a similar movement to the semaphore arm 52, which in its normal position is upright, this being the customary position of a semaphore arm to indicate safety. The movement of the semaphore arm is sufficient to carry it to a horizontal position, which is generally accepted, and generally known as a danger position. As the rim 16 is thus rotated the pin or lug 18 is carried from a normally upright position to a substantially horizontal position with respect to the axis of rotation. On reaching this position the pin 18 is brought into engagement with a bevel 126 on one end of a latch bolt 127 having a sliding bearing in a boss 128 formed on the corresponding side of the box 4. The latch bolt 127 is provided with a longitudinal slot 129 and is urged toward the projected position by a spring 130 housed within the boss 128 back of the latch bolt 127. This latch bolt is in close relation to the corresponding side of the rim 16, and is so arranged in the path of the pin 118 that when the semaphore arm 52 is in the horizontal position the latch bolt engages behind the pin 118 and thus holds the rim 116 and the semaphore arm 52 in a latched position with the semaphore arm horizontal.

Extending through the slot 129 is a bar 131 having a bevel notch 132 therein, the bar being guided by a passage 133 through the boss 128, which latter is provided with a cover plate 134, whereby the latch 127 and corresponding end of the bar 131 may be readily placed in position. One end of the slot 129 is beveled, as indicated at 135, to match the beveled recess 132. The bar 131 is of sufficient length to extend downwardly through the bottom of the box 4 and throughout the length of the tube 73 and at the lower end is connected by a pivot pin 136 to a bar 137 seated in a casing 138 appropriately sunk in the floor 3. The bar 137 is mounted in substantially the same manner as the bars 93 and 100 and is provided with a spring support 139 normally sustaining the end of the bar connected to the rod 131 in the lifted position, so as to project a suitable distance above the floor 3. The top of the bar 137 is rounded, as indicated at 140, in like manner to the bars 93 and 100 and for a like purpose.

In Fig. 1 and associated figures it is assumed that the semaphore 52 is when in the safety position within the door opening 2, so as to be hidden from the view of pedestrians or others passing along in front of the garage.

Under some circumstances it may be found advisable to have the semaphore always exposed to view, so that pedestrians and others will be apprised of the presence of a danger signal on the garage even though it is seen in the safety position. An arrangement whereby such constant display of the semaphore is brought about is indicated in Fig. 13, where there is shown a bracket 141 projecting from the front of the garage for a suitable distance at about the level of the top of the box 4 and the semaphore 52 is shown as pivotally mounted on the outer end of the bracket 141. Extending from the rock member or rim 16 to a corresponding point on the pivoted end of the semaphore 52 is a link 142, so arranged that on rocking the rim 16 a similar rocking movement is imparted to the semaphore blade 52 and the latter is moved to the safety or to the danger position in the same manner as occurs in the structure of Fig. 1 and associated figures, the only difference being that the semaphore is spaced outwardly from the front of the building for a distance determined by the length of the bracket 141. The rest of the structure remains as already described with reference to the other figures.

For obvious reasons it is necessary that the semaphore or like visual signal be placed at a considerable distance above the roadway, for otherwise it might when in the danger position interfere with pedestrians or others. The signal is, therefore, of necessity located at such a height that it might not attract the attention of passers-by. For this reason it is advisable to associate with the semaphore an audible signal which will surely attract attention, and the audible signal may be placed adjacent to the visual signal, thus constraining a passer-by to look toward the visual signal, and thus be made aware of the danger conditions. For this purpose a bell 143 is placed upon the building, preferably the front of the building, close to the position of the semaphore arm. By preference the bell 143, which may be taken as typical of any suitable audible signal, is an electric bell of as obtrusively audible a character as may be found advisable.

To cause the bell to ring when the semaphore arm is in the danger position there is provided a normally open circuit closer 144 within the box 4, and provided with an elastic arm 145 in the path of the rack bar 20, the upper end of which latter is beveled as shown at 146, so as to engage the arm 145 as the rack bar rises without liability of catching on the contact arm, and the rack bar is constrained to travel without side movement by a guide lug 147 on the back of the casing 4 and projecting to a point opposite that part of the rim 16 provided with teeth 19, the arrangement being such that when the rack bar 20 engages the contact arm 145 said arm is forced into engagement with another contact which may be a binding post 148, the arm 145 being connected to another binding post 149. These binding posts have respective conductors 150 and 151 connected to them, one conductor, say, the conductor 150, leading to one side of the bell 143, and the other conductor 151 leading to one side of a battery 152, while the other side of the battery, which may represent any suitable source of electric current, is connected by a conductor 153 to the other side of the bell 143. By this means as the semaphore is moved toward the danger position the electric circuit, including the battery 152 and bell 143, is closed at the circuit closer 144, and the bell rings so long as such circuit remains closed, which is until the semaphore arm returns to the safety position.

In order to prevent the piston from rising beyond a predetermined limit, a rubber or other stop member 147ª is made fast to the rack bar 20 so as to engage the stud or boss 147 when the piston has risen high enough to bring the semaphore to the horizontal locked position.

At night time it may be advisable to illuminate the semaphore arm, and under such conditions a small electric lamp 154 is mounted in the arm 52 and is arranged to have the circuit thereto closed through a fixed contact finger 155 in the path of a movable contact 156, which latter may be mounted on the cup extension 46, but preferably inside of the box 4, so as to be free from the effects of weather conditions. The lamp 154 may be a battery lamp and receive current from the battery 152, or where street current is available the lamp may be energized by street current, but these are features well within the province of the electric lighting engineer and need not be here considered.

When it is desirable that an automobile should leave the garage, one set of wheels constituting the fore wheels or the hind wheels, in accordance with the direction of travel of the machine in leaving the garage, makes contact with the bar 93, causing its depression under the weight of the vehicle. This through the shoulder 98 actuates the rod 76 in a direction to rock the lever 70, so as to move the slide 43 in a direction to compress the spring 44 and thereby move the valves 36 and 37, so as to open the valve 36 and close the valve 37. The movement of the slide 43 is sufficient to bring the notch 68, which is normally to one side of the pointed end 67 of the rod 61, into coincidence with such pointed end, whereupon the expansion of the spring 64, which spring is normally in the compressed condition, causes the pointed end 67 of the rod 61 to move into the notch 68, thereby locking the slide 43 in the new position, and at the same time rocking the end 56 of the lever 57 toward the pin or lug 55 on the rim 16.

The opening of the valve 36 causes the admission of air under pressure to the valve tube or casing 31, from whence the air freely passes by the port 34 into the interior of the cylinder 27 underneath the piston 22. The accumulating air under pressure thus admitted to the cylinder 27 causes a lifting of the piston 22 and a movement of the valve rod 21 and rack bar 20 in an upward direction in the position of the parts, as shown in the drawings. The travel of the piston 22 and of the rack bar 20 imparts a rotative movement to the rim 16 in a direction to swing the semaphore arm 52 from the normal upright safety position to a horizontal danger position. As the rack bar 20 rises the circuit of the bell 143 is closed in a manner already described, and the bell begins to ring and continues to ring so long as the semaphore remains in the danger position, thus attracting attention to the semaphore, so that a passer-by is warned that dangerous conditions prevail, and is thereby constrained to take proper precautions to avoid the danger. As soon as the piston 22 reaches the highest position of its travel, the pin or lug 18 reaches and snaps by the bevel end 126 of the latch 127, which latter thereupon is moved by the spring 130 into the path of the pin 18, thus preventing return movement of the rim 16 and semaphore arm, so that the semaphore arm becomes locked in the danger position. Just before this danger position is reached the pin 55 is brought into engagement with the arm 56 and rocking the lever 57 causes a compression of the spring 64 and a lifting of the rod 61 to an extent moving the end 67 out of the notch 68. While these operations have been taking place the wheels of the automobile first engaging the bar 93 have passed over and released this bar, whereupon the spring 104 causes an elevation of the bar 93 to its first or normal position and the spring 92ª compressed by the depression of the bar 93 is free to return the rod 76 to its first position, which is permitted as soon as the slide 43 has been unlocked by the lifting of the rod 61. The result of this is that as soon as the semaphore arm has reached the danger position the cylinder 27 is cut off from the supply of compressed air because of the return of the valves 36 and 37 to the first position, whereby the valve 36 becomes closed and the valve 37 is open to the atmosphere, so that the compressed air within the cylinder 27 may exhaust.

The bar 100 is close enough to the bar 93 to be engaged by the wheels of the vehicle engaging the bar 93 before leaving the latter, but since the bar 93 is at the time depressed the bar 100 is locked against depression and so does not yield to the passage of the vehicle.

When the second pair of wheels of the vehicle passes over the bars 93 and 100, air may be momentarily admitted to the cylinder 27, but becomes at once exhausted therefrom and the admission valve becomes at once closed because the rod 61 is then held against dropping into the notch 68 by the continued engagement of the pin 55 with the end 56 of the lever 57, due to the locking of the semaphore in the danger position.

The bars 93 and 100 are placed at a suitable distance from the bar 137 located at the door of the garage and the distance between these bars may be as much greater than the length of the wheel base of automobiles as may be deemed advisable.

The projection of the front or rear of the automobile beyond the corresponding wheels is ample to bring a considerable portion of the automobile outside of the door before the wheels will engage the bar 137. When, however, this bar is engaged by the automobile wheels, the weight of the automobile depresses the bar, thus correspondingly pulling down the rod or bar 131, which movement causes the bevel notch 132 to act upon the beveled end 135 on the slot 129 in a manner to withdraw the end 126 of the latch bar 127 from the path of the pin 18. When the semaphore arm is moved to the danger position the counterweight 17 is raised through an arc of about ninety degrees, and hence has a tendency to return to the first or lowermost position. When the latch 127 is withdrawn from holding relation to the pin 18 the counterweight 17 is released and this weight is sufficient to cause a return of the semaphore to the normal upright position and a lowering of the piston 22 toward the bottom of the cylinder 27, the air within the cylinder escaping by the then open valve 37, which valve may be so proportioned with relation to the capacity of the cylinder 27 as to more or less retard the escape of air, whereby the piston 22 and cylinder 27 act after the manner of a dash pot to cause the semaphore arm to move slowly to the safety position, so that an automobile may be wholly or in great part out of the garage before the semaphore arm has reached the full safety position.

Where an automobile enters the garage the bar 137 is depressed and operates the latch 127 as before, but the pin 18 being then well out of the way of the latch is not affected thereby. When the entering automobile reaches the bar 100, the latter is depressed by the weight of the automobile and causes a movement of the bolts 113, 118 and 119 in a manner already described to lock the bar 93 against depression under the weight of the automobile. Hence the entering automobile does not affect the bar 93 and, therefore, does not cause the operation of the semaphore actuating mechanism to move the semaphore to the danger position.

The foregoing description has to do with pneumatically operated apparatus which may be taken as indicative of any apparatus capable of working under fluid pressure for the purposes of the invention, but the invention is not confined to a fluid operated structure, since the warning devices may be operated electrically. One manner of electrically operating the warning signals is illustrated more or less schematically in Fig. 14. The showing of this figure is deemed to be sufficient to indicate a practical embodiment of the invention when electrically operated, especially when such electrical operation utilizes some features of the mechanism already described. It may be here stated that no claim is made herein to the electrical means indicated in Fig. 14, since such electrical means are shown and described in greater detail and are claimed in another application Serial No. 15,384 filed by me on March 18, 1915 for electrically operated warning signal means for garages.

In Fig. 14 there is a semaphore 52 and bars 93 and 100 with locking bolts 113, 118 and 119, all as in the structure described with reference to Figs. 1 to 13. There is also provided an electric lamp 154 in the semaphore arm and an audible signal which may consist of an electric bell 143. The semaphore arm is mounted upon a rim 16ᵃ carried by a rotatable hub or spindle 157, which, for the purposes of the present invention, may be considered as a metallic hub or spindle. The rim 16ᵃ has formed in it, or carries a counterweight 17ᵃ, but this counterweight is so related to the rim 16ᵃ and to the semaphore arm 52 as to be in the elevated position when the semaphore arm 52 is upright, or in the safety position. The rim 16ᵃ is also provided with a peripheral notch 158 normally spaced from but having in its path a latch tooth 159 on the end of a spring 160, so arranged as to move the tooth 159 into the notch 158 when the latter is brought into coincidence with the tooth, as occurs when the semaphore arm 52 is in the horizontal or danger position, so that under such circumstances the semaphore arm becomes locked in the danger position. Associated with the tooth 159 is an electromagnet 161, the office of which is to withdraw the tooth 159 from the notch 158 when the magnet is energized in a manner to be described. There is also provided a solenoid 162 having a core 163 connected by a flexible strand 164 or otherwise to the rim 16ᵃ. The core 163 is of a weight to overbalance the counterbalance weight 17ᵃ, and when the solenoid coil 162 is not energized the core 163 holds the semaphore arm 52 in the upright or safety position. Bearing upon the hub or spindle 157 are brushes 165, 166, 167 and 168, there being four brushes in the particular showing of the drawings. In the path of these brushes the hub 157 has inset insulation sections or blocks 169 to 172.

An electrical system must, of course, have a suitable source of current, and this is indicated in Fig. 14 as a battery 173, but it will be understood that the battery 173 is to indicate any suitable source of electrical current which may, if desired, be street current. One side of the battery 173 is connected to the spindle 157 by a conductor 174, and since the spindle only makes a quarter turn the connection of the conductor 174 to the spindle may be a permanent connection and the conductor be of a sufficiently flexible nature to permit the movement of the spindle.

Under the control of the bar 93 is an electric switch 175. This switch may be of the progressive step by step type, which when actuated will close the circuit and then when actuated again will open the circuit, and so on. There are various types of such switches upon the market, and hence the switch is merely indicated in the drawings without any attempt to show a particular construction thereof. The switch 175 is connected on one side by a conductor 176 to one side of the winding of the solenoid 167, and the other side of the switch is connected by a conductor 177 to that side of the battery 173 remote from the side of the battery connected to the spindle 157. The other side of the winding of the solenoid 162 is connected by a conductor 178 to the brush 167. The solenoid 162 is, therefore, in circuit with the battery 173 by way of the conductor 174, spindle 157, brush 167, conductor 178 on one side, and by way of the conductor 176, switch 175 and conductor 177 on the other side. The circuit, however, is completed or broken by the switch 175, which is under the control of the bar 93.

The bar 137, which is utilized in the electrically operated structure, carries a contact terminal 179 which may be connected by a conductor 180 to the conductor 177, which in turn is connected to one side of the battery 173. In the path of the contact 179 is another contact 181 connected by a conductor 182 to one side of the winding of the magnet 161, while the other side of the winding of this magnet is connected by a conductor 183 to the brush 168 which normally rests upon the insulating segment 172 of the spindle 157, this insulating segment being of such a length that the brush 168 contacts with the conducting part of the spindle 157 as the semaphore arm reaches the horizontal or danger position.

The bell 143 is connected on one side by a conductor 184 to that side of the battery 173 remote from the conductor 174, or the conductor 184 may be connected to the conductor 177 and by the latter be connected to the battery as described. The other side of the bell 143 is connected by a conductor 185 to the brush 166, which is in normal engagement with the insulating segment 170 when the semaphore arm 52 is in the upright or safety position.

The lamp 154 is connected on one side by a conductor 186 with the brush 165, which in the normal or upright position of the semaphore arm 52 rests upon the insulating segment 169. The other side of the lamp 154 is connected by a conductor 187 through a switch 188 to the conductor 184 to thereby connect up to that side of the battery 173 remote from the conductor 174 connecting the other side of the battery to the spindle 157.

With an arrangement such as described with reference to Fig. 14 an automobile on approaching the door of the garage to leave the latter, first contacts with the bar 93, which latter being free to move causes the actuation of the switch 175 in a manner to close the circuit to the winding of the solenoid 162. This winding being thereby energized lifts the core 163, thus releasing the semaphore arm 52 to the gravitating action of the counterweight 17ᵃ, which latter rocks the semaphore arm with the spindle 157 until the semaphore arm assumes the horizontal or danger position, at which point the tooth 159 snaps into the notch 158, whereby the semaphore arm becomes locked in such danger position. As this occurs the brush 167 rides upon the insulating segment 171 in its path, and even though the switch 175 be at the time closed the circuit to the solenoid 162 is broken, wherefore there is no waste of current, since the semaphore cannot return to the safety position because it is then locked by the latch tooth 159. Since the depression of the bar 93 locks the bar 100 the latter is not affected by the passing automobile for the reason already described with reference to the pneumatic form of the invention. In the meantime the brush 166 passes upon the conducting portion of the spindle 157, and thereby there is established a circuit from the battery 173 by way of the conductor 174 to the spindle 157, thence by way of the brush 166 and conductor 185 to the bell 143, the other side of the bell being connected to the other side of the battery by the conductors 184 and 177. In like manner the brush 165 passes from the insulating segment 169 upon the conducting portion of the spindle 157, so that the lamp 154 is connected to the battery 173 by way of the conductor 174, spindle 157, brush 165 and conductor 186 on one side, and the conductor 187, switch 188, and conductors 184 and 177 on the other side. In day time, however, the switch 188 may be open, wherefore the lamp 154 will not then be energized.

The magnet 161 is in circuit with the battery 173 except for the break at the contacts 179 and 181 controlled by the bar 177, the circuit of the magnet having already been traced. Now, when the automobile reaches the bar 137 the latter is depressed and the contact 179 is brought into engagement with the contact 181, thus establishing a circuit through the magnet 161 and energizing it to cause the withdrawal of the latch tooth 159 from the notch 158. The solenoid 162 being at this time deënergized the semaphore arm 52 after being unlatched is returned to the upright or safety position by the overbalancing action of the core 163, the switch 175 having in the meantime been moved to the open position by the second actuation of the bar 93 caused by the passage of the second set of wheels of the automobile over it wherefore the movement of the brush 167 upon the conducting portion of the spindle 159 has no effect upon the solenoid 162. The lamp 154, if the switch 188 be closed, and the bell 145 are both cut out of circuit by the movement of the insulating segments 169 and 170 into engagement with the brushes 165 and 166, thus separating them electrically from the spindle 157.

If the automobile be entering the garage equipped with the electrical system of Fig. 14, a depression of the bar 137 bringing the contact 179 into engagement with the contact 181 has no effect upon the magnet 161, since the brush 168 is then electrically separated from the spindle 157 by the insulating segment 172. As the entering automobile comes in contact with the bar 100, it causes a locking of the bar 93 against depression, so that the switch 175 is not operated and the solenoid 162 remains inert.

The operation of the electrical system of Fig. 14 is, so far as the automobile is concerned, the same as that of the pneumatic or fluid pressure arrangement of Fig. 1 and associated figures.

While the invention has been described with special reference to garages and automobiles, it is in whole or in part useful in other connections, and while for convenience of description the terms garage and automobile are employed in the claims, it is to be distinctly understood that such terms are not to be considered as limiting the invention to use in such particular connections.

What is claimed is:—

1. A warning signal means for garages comprising a visual signal device located adjacent to the place of egress of automobiles from the garage, operating means for the signal device located within the garage in the path of the wheels and responsive to the passage of an automobile in a direction to emerge from the garage, and means for locking the signal operating means against action on the passage of the automobile into the garage.

2. A warning signal means for garages comprising signal instrumentalities located with respect to the place of egress of automobiles from the garage to apprise passers by of danger conditions, means located in the floor of the garage and spaced from the place of egress of an automobile therefrom and responsive to the passage of the automobile wheels to cause the actuation of the signal instrumentalities to indicate danger, and other means in the floor of the garage and located close to the place of egress and also in the path of the wheels of the automobile and responsive thereto while moving through a place of egress for restoring the indicating instrumentalities to a condition signifying safety.

3. A warning signal means for garages located with respect to the place of emergence of automobiles from the garage to warn passers by of impending danger, means located in the floor of the garage and responsive to the passage of an automobile in one direction therefrom for setting the indicating means to the danger position, and means also located in the floor of the garage and responsive to the passage of the wheels of the automobile thereover in the same direction for causing the restoration of the indicating means to the safety indicating position, the first-named means responsive to the passage of the automobile being spaced from the second-named means responsive to the passage of the automobile by a distance within the garage greater than the length of the wheel base of the automobile.

4. A warning signal means for garages comprising visual and audible signal means located with respect to the place and emergence of automobiles from the garage to apprise passers by of impending emergence of an automobile, means located in the floor of the garage and responsive to the passage of an automobile therefrom for causing the display of the visual means in a position indicating danger and the sounding of the audible means, and other means in the floor of the garage and responsive the passage of the automobile therefrom for restoring the visual means to safety indicating position and for hushing the audible means.

5. A warning signal means for garages comprising visual and audible signal means, means responsive to the passage of an automobile for causing the display of the visual means in a position indicating danger, and the sounding of the audible means, and other means responsive to the passage of the automobile for restoring the visual means to safety indicating position and for hushing the audible means, the second-named means responsive to the passage of the automobile being located adjacent to the place of egress of the automobile from the garage and the first-named means responsive to the passage of the automobile being located within the garage at a distance from said second-named means to cause the display of the danger signal before the automobile reaches the place of egress.

6. A warning signal means for garages comprising danger indicating means, means in spaced relation to the place of egress for automobiles from the garage and responsive to the passage of an automobile toward said place of egress to set the signal means into danger indicating condition, means responsive to the passage of the automobile in the same direction as first mentioned and located adjacent to the place of egress from the garage for causing the restoration of the danger indicating means to the safety indicating condition, and means for rendering the means responsive to the passage of the automobile inert to such passages when in a direction to enter the garage.

7. A warning signal means for garages comprising danger indicating means, means in spaced relation to the place of egress for automobiles from the garage and responsive to the passage of an automobile toward said place of egress to set the signal means into danger indicating condition, means responsive to the passage of the automobile in the same direction as first-mentioned and located adjacent to the place of egress from the garage for causing the restoration of the danger indicating means to the safety indicating condition, and means for rendering the means responsive to the passage of the automobile inert to such passage when in a direction to enter the garage, the danger indicating means including both visual and audible instrumentalities.

8. A warning signal means for garages comprising danger indicating means. means in spaced relation to the place of egress for automobiles from the garage and responsive to the passage of an automobile toward said place of egress to set the signal means into danger indicating condition, means responsive to the passage of the automobile in the same direction as first mentioned and located adjacent to the place of egress from the garage for causing the restoration of the danger indicating means to the safety indicating condition, and means for rendering the means responsive to the passage of the automobile inert to such passages when in a direction to enter the garage, the danger indicating means including a semaphore arm and a bell in adjacent relation with the arm visible exterior to the garage when in the danger indicating position.

9. A warning signal means for garages comprising danger indicating means, actuating means for the danger indicating means for setting the latter in danger indicating condition and including means responsive to the passage of an automobile in a direction to emerge from the garage and also including locking means for holding the last-named means inert to the passage of the automobile on entering the garage, and other means, responsive to the emergence of the automobile from the garage for restoring the danger indicating means to normal inert condition.

10. A warning signal means for garages comprising visual danger indicating means having a normal inert position as to indications and capable of being set into danger indicating condition, means located in the indicating condition, means located in the floor of the garage within such garage in the path of an automobile moving toward the place of emergence from the garage and responsive to the passage of the automobile when traveling toward the place of egress to set the danger indicating means into danger indicating condition, and other means in the floor of the garage adjacent to the place of egress and responsive to the passage of the automobile to cause the restoration of the danger indicating means to the inert condition subsequent to the setting thereof in the danger condition.

11. A warning signal means for garages comprising danger indicating means located in position with respect to the place of emergence from the garage to warn passers-by of the approach of an automobile within the garage to said place of emergence, and means responsive to the passage of an automobile through said place of emergence for operating the danger indicating means and comprising yieldable members set in the floor of the garage in position to be engaged by the wheels of the automobile and means controlled by the yieldable members for causing the setting of the danger indicating devices into danger indicating condition and to restore said danger indicating devices to normal condition in order by the movement of the automobile toward and through the place of emergence from the garage.

12. A warning signal means for garages comprising danger indicating means, means for causing the setting of the danger indicating means into danger indicating condition, means located in the floor of the garage and responsive to the passage of an automobile thereover in a direction toward the place of emergence from the garage to cause the setting of the danger indicating means into danger indicating condition, means located in the floor of the garage adjacent to the place of emergence and responsive to the passage of an automobile thereover to cause the restoration of the danger indicating means after being set to the normal or inert condition, and locking means for and on the side of the first-named means responsive to the passage of an automobile toward the place of emergence and responsive to the passage of an automobile thereover in a direction the reverse of the first-named direction of travel of the automobile to hold the first-named means responsive to the passage of the automobile against responsive action to an automobile entering the garage.

13. A warning signal means for garages comprising a semaphore arm, an actuating means therefor located adjacent to the place of emergence from the garage, an audible signal means located adjacent to the semaphore arm, actuating means for the semaphore arm for moving it to danger position and for restoring it to safety position, means for causing the sounding of the audible signal on the movement of the semaphore arm to danger position, and spaced means located in the floor of the garage adjacent to the place of emergence from the garage and at a point spaced therefrom into the garage and actively responsive to the passage of an automobile moving in a direction to emerge from the garage, the means distant from the place of emergence having connections with the operating means for the semaphore to cause the actuation thereof to the danger position on the passage of an automobile toward the place of emergence, and the first-named means responsive to the passage of an automobile having connections to the restoring means for the semaphore to cause its movement to the inert position after having been set.

14. A warning signal means for garages comprising a semaphore located adjacent to the place of emergence from the garage to be moved to a position exterior thereto to indicate danger, means for actuating the semaphore to the danger position and for restoring it to the safety or inert position, and means for causing the operation of the semaphore actuating means by the passage of an automobile from within to the exterior of the garage through the place of emergence comprising means responsive to the passage of the automobile and located within the garage at a distance from the place of emergence and provided with connections to the means for moving the semaphore to the danger position, and other means responsive to the passage of an automobile and located adjacent to the place of emergence and having connections to the means for restoring the semaphore to the inert position.

15. A warning signal means for garages comprising a semaphore located adjacent to the place of emergence from the garage to be moved to a position exterior thereto to indicate danger, means for actuating the semaphore to the danger position and for restoring it to the safety or inert position, and means for causing the operation of the semaphore actuating means by the passage of an automobile from within to the exterior of the garage through the place of emergence comprising means responsive to the passage of the automobile and located within the garage at a distance from the place of emergence and provided with connections to the means for moving the semaphore to the danger position, and other means responsive to the passage of an automobile and located adjacent to the place of emergence and having connections to the means for restoring the semaphore to the inert position, the first-named means responsive to the passage of an automobile having means associated therewith and also responsive to the passage of an automobile for locking said first-named means against response to the passage of an automobile on the travel of an automobile thereover when entering the garage.

16. A warning signal means for garages, comprising a danger indicating device movable from an inert or safety indicating position to a danger indicating position and back again, means for temporarily locking the danger indicating device in the danger position, pneumatic means for actuating the danger indicating device to the danger position, a valve structure for controlling the admission of air to the pneumatic means and its escape therefrom, means responsive to the passage of an automobile for actuating the valve to admit air under pressure to the pneumatic means, locking means for the valve for holding it in the position to which it is actuated by the passage of an automobile, and means for unlocking the valve by the attainment of the danger indicating means to the danger indicating position.

17. A warning signal means for garages, comprising a danger indicating device movable from an inert or safety indicating position to a danger indicating position and back again, means for temporarily locking the danger indicating device in the danger position, pneumatic means for actuating the danger indicating device to the danger position, a valve structure for controlling the admission of air to the pneumatic means and its escape therefrom, means responsive to the passage of an automobile for actuating the valve to admit air under pressure to the pneumatic means, locking means for the valve for holding it in the position to which it is actuated by the passage of an automobile, and means for unlocking the valve by the attainment of the danger indicating means to the danger indicating position, said warning signal means also including other means responsive to the passage of an automobile subsequent to the setting of the danger indicating means to the danger position for releasing said danger indicating means to return to the normal or safety indicating position.

18. A warning signal means for garages comprising a rockable semaphore having a normal tendency to maintain a safety indicating position, a locking means for holding the semaphore in the danger position, pneumatic means for actuating the semaphore to the danger position, a valve structure for admitting air under pressure to the pneumatic means and causing its discharge therefrom in accordance with the position of the valve structure, means responsive to the passage of an automobile in a direction to emerge from the garage for moving the valve structure to the air-admitting position, a lock for holding the valve structure in the last-named position while the semaphore is being moved to the danger position, means for unlocking the valve by the attainment of the semaphore to the danger position, and means responsive to the passage of an automobile for unlocking the semaphore for return from the danger position to the safety position.

19. A warning signal means for garages comprising a rockable semaphore having a normal tendency to maintain a safety-indicating position, a locking means for holding the semaphore in the danger position, pneumatic means for actuating the semaphore to the danger position, a valve structure for admitting air under pressure to the pneumatic means and causing its discharge therefrom in accordance with the position of the valve structure, means responsive to the passage of an automobile in a direction to emerge from the garage for moving the valve structure to the air admitting position, a lock for holding the valve structure in the last-named position while the semaphore is being moved to the danger position, means for unlocking the valve by the attainment of the semaphore to the danger position, and means responsive to the passage of an automobile for unlocking the semaphore for return from the danger position to the safety position, said warning signal means also including an audible signal and electric means for operating the signal including circuit closing means in position to be closed by the movement of the mechanism actuating the semaphore arm toward the danger position.

20. A warning signal means for garages comprising a rockable counterweight member having a normal constraint toward one position, a semaphore arm carried thereby and normally held in the safety position by said rockable member, pneumatic means for moving the rockable member to carry the semaphore arm to danger position, locking means for holding the rockable member in the position to which it is actuated by the pneumatic means, a reciprocable valve structure movable in one direction to admit air under pressure to the pneumatic means and in the other direction to exhaust air therefrom, a lock for the reciprocable valve for holding it in position to admit air to the pneumatic means, means carried by the rockable member for releasing the valve on the attainment of the semaphore arm to danger position, means responsive to the passage of an automobile in one direction for moving the valve to admit air to the pneumatic means, and means under the control of the movement of an automobile in the same direction as first stated for causing the release of the rockable member after its actuation to carry the semaphore to the danger position.

21. A warning signal means for garages comprising a rockable member provided with a circular rim having spaced stop members thereon and a counterweight at one side of its axis with gear teeth on the peripheral portion, a cylinder, a piston, and piston rod therein, a rack bar carried by the piston rod in engagement with the gear teeth and movable with the piston to cause the rockable member to rock in opposition to the normal tendency of the counterweight, a semaphore arm carried by the rockable member and movable therewith from a normal position of safety to a position indicating danger, a lock in the path of one of the stop members for temporarily holding the rockable member with the semaphore arm in the danger position, a reciprocable valve structure associated with and traversing the cylinder and provided with inlet and outlet valves for the cylinder for admitting air under pressure thereto and exhausting air therefrom, a slidable lock member associated with the valve structure for holding said valve structure in the air admitting position, another lock member associated with the first lock member and having a portion in the path of one of the stop members on the rockable member for releasing the valve when the semaphore is in the other position, a yieldable member located in the floor of the garage and responsive to the passage of an automobile thereover and provided with connections to the slidable lock member with said connections having a normal constraint to move the slidable lock member to the unlocked position and the valve structure having a normal constraint in the same direction, and another yieldable member located in the floor of the garage and responsive to the passage of an automobile thereover and having connections to the lock means for temporarily holding the semaphore arm in the danger position to cause the release of the semaphore arm from the lock means on the passage of the automobile.

22. A warning signal means for garages, comprising a danger indicating means movable into and out of danger indicating position, and means for causing the operation thereof by the passage of an automobile consisting of a yieldable member located in the floor of the garage with means responsive to the yielding of said member for setting the danger indicating means into the danger condition, and means associated with said yieldable member for locking it against response to the passage of an automobile movable in a direction to enter the garage.

23. A warning signal means for garages comprising danger indicating instrumentalities capable of being set into danger indicating condition and to be returned to the normal or inert condition, and means lodged in the floor of a garage in operative relation to the place of emergence for causing the actuation of the danger indicating means by the passage of an automobile within the garage toward the place of emergence therefrom, said means responsive to the passage of the automobile comprising a yieldable bar, means responsive to the movement of the bar under the weight of the automobile to cause the actuation of the danger indicating means to the danger position, another bar associated with the first-named bar and responsive to the passage of an automobile, and lock means associated with both bars for causing the locking of the first-named bar on the passage of an automobile in a direction to first engage the second-named bar.

24. A warning signal means for garages comprising danger indicating instrumentalities capable of being set into danger indicating condition and to be returned to the normal or inert condition, and means lodged in the floor of a garage in operative relation to the place of emergence therefrom for causing the actuation of the danger indicating means by the passage of an automobile within the garage toward the place of emergence therefrom, said means responsive to the passage of the automobile comprising a yieldable bar, means responsive to the movement of the bar under the weight of the automobile to cause the actuation of the danger indicating means to the danger position, another bar associated with the first-named bar and responsive to the passage of an automobile, and lock means associated with both bars for causing the locking of the first-named bar on the passage of an automobile in a direction to first engage the second-named bar, said lock means comprising a lock bolt wholly lodged within the first-named bar, another yieldable lock bolt to one side of the first-named lock bolt and in normal alinement therewith, and another lock bolt extending between the two bars in normal alinement with the other lock bolts with the last-named lock bolt and the second-named bar having coacting portions for causing longitudinal simultaneous movements of the lock bolts on the depression of the second-named bar.

In testimony, that I claim the foregoing as my own, I have hereto affixed my signature in the presence of two witnesses.

THOMAS D. WARNER.

Witnesses:
E. G. SIGGERS,
EDITH L. BROWN.